No. 878,001. PATENTED FEB. 4, 1908.
B. F. HUDSON.
STEAM COUPLING HEAD.
APPLICATION FILED AUG. 6, 1907.
2 SHEETS—SHEET 1.
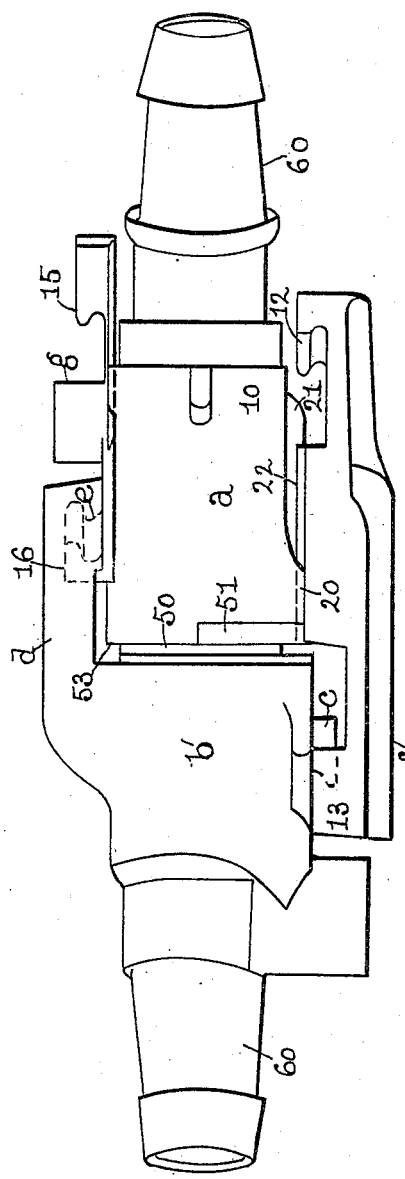
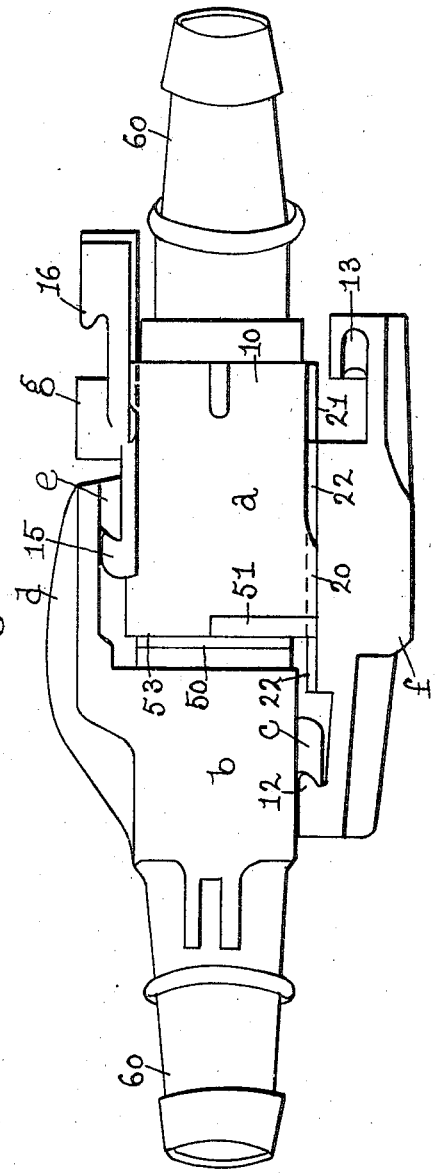
*Witnesses.* *Inventor.*
Benjamin F. Hudson
by Jas. H. Churchill
Atty.

No. 878,001. PATENTED FEB. 4, 1908.
B. F. HUDSON.
STEAM COUPLING HEAD.
APPLICATION FILED AUG. 6, 1907.
2 SHEETS—SHEET 2.
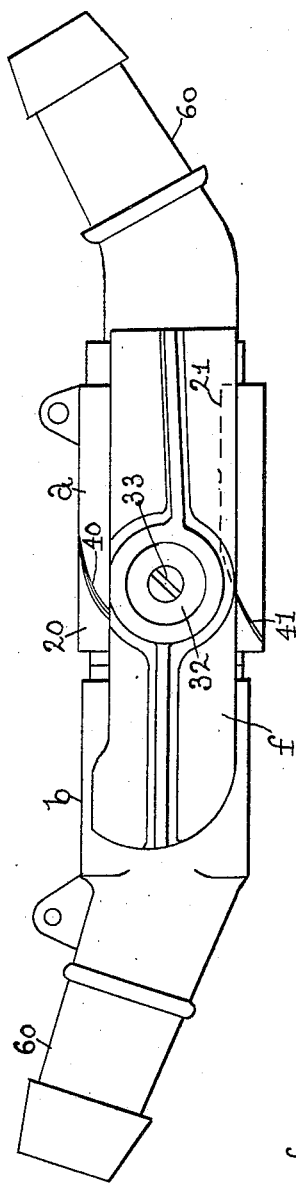
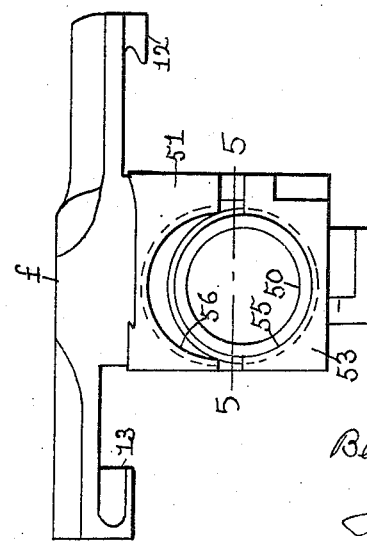
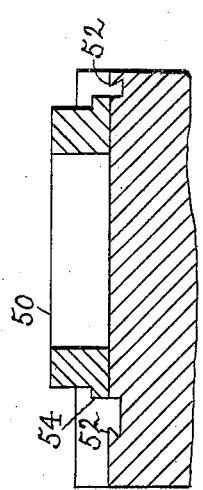
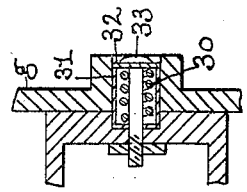
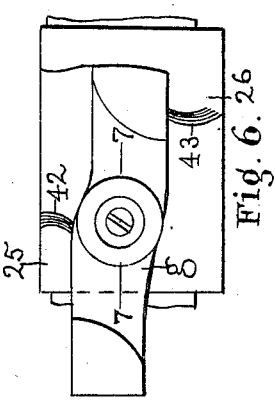

UNITED STATES PATENT OFFICE.

BENJAMIN F. HUDSON, OF SAUGUS, MASSACHUSETTS.

STEAM COUPLING-HEAD.

No. 878,001. Specification of Letters Patent. Patented Feb. 4, 1908.

Application filed August 6, 1907. Serial No. 387,281.

*To all whom it may concern:*

Be it known that I, BENJAMIN F. HUDSON, a citizen of the United States, residing in Saugus, in the county of Essex and State of Massachusetts, have invented an Improvement in Steam Coupler-Heads, of which the following description, in connection with the accompanying drawings, is a specification, like letters on the drawings representing like parts.

This invention relates to a coupling for flexible pipes or hose, and such as now commonly used on railway cars to couple the steam pipes of connected cars.

The invention has for its object to provide a coupling which is capable of being joined to another coupling of the same size or to a coupling of a different size, thereby enabling cars having one size of coupling to be connected in service with cars having the same or different sizes of couplings.

The invention further has for its object to provide a simple and efficient means for securing the rubber or other gasket in place in the coupling, whereby a steam-tight joint may be obtained between connected couplings, and whereby said gasket can be quickly and easily removed when desired.

These and other features of this invention will be pointed out in the claims at the end of this specification.

Figure 1 is a plan view of a coupling embodying this invention, joined to a coöperating coupling of substantially the same size. Fig. 2 is a plan view showing the coupling embodying this invention as joined to a coupling of larger size than that to which it is joined in Fig. 1. Fig. 3, a side elevation of the couplings shown in Fig. 1.
Fig. 4, an end elevation of the improved coupling showing the same in position to remove the gasket. Fig. 5, a detail in section on the line 5—5, Fig. 4. Fig. 6, a side elevation of the coupling shown in Fig. 1, and Fig. 7, a sectional detail to be referred to.

Referring to Fig. 1, *a* represents a coupling embodying this invention, which is shown as connected with a coupling *b*, of any of the well-known standards, and comprising a head provided on one side with an eccentric or wedge-shaped locking lug or projection *c* and on the other side with an arm *d* having a similar locking projection or lug *e*.

The coupling *b'* shown in Fig. 2 is of the same construction as the coupling *b* shown in Fig. 1, except that it is of a different size, being larger.

The present invention has for its object to provide the coupling *a* with means as will be described, whereby it may be used equally as well with either of the couplings *b b'*. To this end, the head 10 of the coupling *a* has pivotally secured to its opposite sides levers *f*, *g*, which are provided with locking fingers or projections adapted to engage the locking lugs or projections on the couplings *b b'*.

The lever *f* is provided on opposite sides of its pivot with inclined or cam-shaped fingers or projections 12, 13, which are arranged out of line with each other, so that in one position of the lever *f*, the finger or projection 12 will engage the lug or projection *c* on the smaller coupling *b* as shown in Fig. 1, and when the lever *f* is given a half turn, the finger or projection 13 will engage the lug or projection *c* on the larger coupling *b'* as shown in Fig. 2.

The lever *g* is provided on opposite sides of its pivot with similar locking fingers 15, 16, which are out of line with each other and which coöperate respectively with the lug or projection *e* on the arm *d* of the larger and smaller couplings *b b'*, as represented in Figs. 1 and 2.

It will thus be seen, that when the coupling *a* is to be joined to the coupling *b*, the levers *f*, *g* are turned on their pivots so that the fingers or projections 12, 15 are toward the front end of the coupling *a* and in position to be engaged with the lugs or projections *c*, *e* on the coupling *b*. When the coupling *a* is to be joined with the larger coupling *b'*, the levers *f*, *g*, are given a half turn and into the position shown in Fig. 2, in which position, it will be seen, that the fingers 13, 16, are at the front end of the coupling *a* and in position to be engaged with the lugs *c*, *e* on the larger coupling *b'*.

Provision is made for permitting the levers *f*, *g* to be turned freely in one direction, and to prevent them being turned in the reverse direction, so that the pivots for said levers are relieved from strain. To this end the coupling *a* is provided on one side near its top and bottom with ribs 20, 21, which are adapted to be engaged by the upper and lower edges of a rib 22 on the inner side of the lever *f* (see Fig. 1), and on the other side, said coupling is provided at substantially diagonally opposite corners with ribs or projections 25, 26 (see Fig. 6), which are adapted to be engaged by the upper and lower sides or edges of the lever g.

The ribs 20, 21 constitute stops for the lever f and the ribs 25, 26 constitute stops for the lever g, and said ribs are beveled at one end to permit the levers f, g, to be turned and after the levers have been turned and assumed their operative positions, each is moved toward the side of the coupling a so as to bring the rib 22 into line with the stops 20, 21, and the lever g into line with the stops 25, 26, by a spring 30 (see Fig. 7) located within a shell or sleeve 31, which forms the pivot for the lever.

Each spring 30 bears at one end against the sleeve 31 and at its other end against a washer 32 on a bolt or screw 33, which may be secured to the coupling a by a nut 34, after the manner represented in Fig. 7.

When the levers f, g are turned so as to change the locking fingers thereon, as above described, the said levers ride over the beveled or inclined ends 40, 41, 42, 43 of the stops 20, 21, 25, 26 and force the levers outward against the action of their springs 30, which are compressed, and when the levers are disengaged from the beveled ends of the stops and brought into their operative positions shown in Figs. 1, 2 and 3, the springs 30 force the levers in toward the sides of the coupling a so as to engage the stops and prevent reverse movement of said levers.

The coupling a is provided at its front end with a gasket 50 of rubber or other suitable material, which is secured to said coupling by a slide piece 51, dove-tailed on its underside so engage dove-tailed ribs 52 on the end of the coupling, said slide piece having a substantially semi-circular opening to coöperate with a like opening in a fixed portion 53 on the end of the coupling through which the circular gasket 50 projects, the latter being provided with an annular flange 54, which is engaged by semi-circular lips 55, 56 on the fixed portion 53 and the movable portion or slide 51 (see Fig. 4). The slide 51 normally locks the gasket to the coupling, and is itself locked by the lever f when the latter is in its operative position, and said gasket is thus locked against accidental displacement, until the lever f is turned substantially at right angles to its operative position as represented in Fig. 4, in which position, the lever is sufficiently below the slide 51 to enable it to be withdrawn after the manner represented in Fig. 4.

I have herein shown one construction of coupling, which I may prefer, but I do not desire to limit my invention in this respect. The couplings a, b and b' are shown as provided with the usual hollow extensions 60 to which the hose or flexible pipe (not sown) is connected.

Claims.

1. In a coupling of the class described, in combination, a coupling head, and levers pivoted to the opposite sides of said head and provided on opposite sides of their pivots with projections, substantially as described.

2. In a coupling of the class described, in combination, a coupling head provided at its front end with a gasket, a slide to lock said gasket to said head, and a lever pivoted to the side of said head and coöperating with said slide to lock it to said head, substantially as described.

3. In a coupling of the class described, in combination, a coupling head provided on its opposite sides with projections forming stops, levers pivoted to the sides of said head and provided with locking fingers on opposite sides of the pivots for said levers, and springs to act on said levers to normally force them into line with said stops, substantially as described.

4. In a coupling of the class described, in combination, a coupling head, and levers pivoted to the opposite sides of said head and provided on opposite sides of their pivots with projections out of line with each other, substantially as described.

5. In a coupling of the class described, in combination, a coupling head, and levers pivoted to said head and having means on opposite sides of their pivots for permitting the said levers to connect the coupling heads to coöperating couplings of different sizes, substantially as described.

In testimony whereof, I have signed my name to this specification in the presence of two subscribing witnesses.

BENJAMIN F. HUDSON.

Witnesses:
    JAS. H. CHURCHILL,
    ALBIN L. RICHARDS.